United States Patent
Zhu et al.

(10) Patent No.: US 8,794,828 B1
(45) Date of Patent: Aug. 5, 2014

(54) METHOD FOR MEASURING TEMPERATURE OF OBJECT USING LONGITUDINAL MODE OUTPUT OF SHORT CAVITY FIBER LASER

(71) Applicant: Beijing Information Science & Technology University, Beijing (CN)

(72) Inventors: Lianqing Zhu, Beijing (CN); Fei Luo, Winchester, MA (US); Mingli Dong, Beijing (CN); Yinmin Zhang, Beijing (CN); Wei He, Beijing (CN); Xiaoping Lou, Beijing (CN)

(73) Assignee: Beijing Information Science & Technology University, Beijing (CN)

( * ) Notice: Subject to any disclaimer, the term of this patent is extended or adjusted under 35 U.S.C. 154(b) by 0 days.

(21) Appl. No.: 14/049,907

(22) Filed: Oct. 9, 2013

(30) Foreign Application Priority Data

Jul. 19, 2013 (CN) .......................... 2013 1 0306008

(51) Int. Cl.
*G01J 5/00* (2006.01)
*H01S 3/00* (2006.01)
*G01K 11/32* (2006.01)

(52) U.S. Cl.
CPC ...................................... *G01K 11/32* (2013.01)
USPC ................ 374/161; 374/130; 374/141; 372/6

(58) Field of Classification Search
USPC ......... 374/130–132, 161, 141, 1–3, 117–119, 374/128, 4; 356/43; 702/99, 130
See application file for complete search history.

(56) References Cited

U.S. PATENT DOCUMENTS

| | | | | | |
|---|---|---|---|---|---|
| 4,901,257 | A | * | 2/1990 | Chang et al. | 702/99 |
| 5,144,632 | A | * | 9/1992 | Thonn | 372/33 |
| 5,272,334 | A | * | 12/1993 | Sai | 250/227.21 |
| 5,765,948 | A | * | 6/1998 | Sai | 374/161 |
| 6,035,081 | A | * | 3/2000 | Poustie et al. | 385/27 |
| 6,263,002 | B1 | * | 7/2001 | Hsu et al. | 372/6 |
| 6,301,272 | B1 | * | 10/2001 | Koch et al. | 372/6 |
| 7,050,172 | B2 | * | 5/2006 | Crickmore et al. | 356/477 |
| 7,633,621 | B2 | * | 12/2009 | Thornton | 356/432 |
| 8,483,247 | B2 | * | 7/2013 | Rossi et al. | 372/29.022 |
| 2002/0061045 | A1 | * | 5/2002 | Zhang et al. | 372/61 |

(Continued)

FOREIGN PATENT DOCUMENTS

| | | | | |
|---|---|---|---|---|
| CN | 101355231 | A | * | 1/2009 |
| JP | 03021836 | A | * | 1/1991 |
| JP | 03021837 | A | * | 1/1991 |

*Primary Examiner* — Gail Verbitsky
(74) *Attorney, Agent, or Firm* — Morris, Manning & Martin, LLP; Tim Tingkang Xia, Esq.

(57) ABSTRACT

A method for measuring temperature of an object using the longitudinal mode output by a short cavity fiber laser, includes steps of: a) arranging the short cavity fiber laser, which laser comprises sequentially coupled laser diode pumping source, a wavelength division multiplexer, a fiber bragg grating, an active optical fiber and a loop mirror which are; b) contacting the short cavity fiber laser with the object whose temperature will be measured; c) measuring the drift amount of longitudinal mode output by the short cavity fiber laser; and d) calculating the temperature of the object to be measured. According to the present invention, the temperature can be measured accurately utilizing the features of the short cavity fiber laser. The arranged fiber laser has a small and simple structure, high measuring accuracy, good portability, and can be used in a variety of occasions.

11 Claims, 3 Drawing Sheets

(56) References Cited

U.S. PATENT DOCUMENTS

| | | | |
|---|---|---|---|
| 2006/0028650 A1* | 2/2006 | Crickmore et al. | 356/479 |
| 2007/0002327 A1* | 1/2007 | Zhou et al. | 356/456 |
| 2007/0211772 A1* | 9/2007 | Romano et al. | 372/20 |
| 2008/0086038 A1* | 4/2008 | Thornton | 600/310 |
| 2008/0130632 A1* | 6/2008 | Leong | 370/352 |
| 2008/0144698 A1* | 6/2008 | Cloutier et al. | 374/161 |
| 2008/0285916 A1* | 11/2008 | Sappey et al. | 385/27 |
| 2013/0161295 A1* | 6/2013 | Tominaga | 219/85.13 |
| 2014/0026461 A1* | 1/2014 | Dakin et al. | 42/111 |

* cited by examiner

METHOD FOR MEASURING TEMPERATURE OF OBJECT USING LONGITUDINAL MODE OUTPUT OF SHORT CAVITY FIBER LASER

CROSS-REFERENCE TO RELATED APPLICATIONS

This non-provisional application claims priority under 35 U.S.C. §119(a) on Patent Application No. 201310306008.6 filed in P.R. China on Jul. 19, 2013, the entire contents of which are hereby incorporated by reference.

TECHNICAL FIELD

The present invention relates to fiber lasers, and particularly to a method for measuring the temperature of an object based on the longitudinal mode output by the short cavity fiber laser.

BACKGROUNDS

As a laser source having broad application prospects, the fiber laser has advantages of a tunable bandwidth, a higher signal-to-noise ratio, and a narrower output laser linewidth, and can be widely used in fields such as fiber sensing, optical fiber communication and optical processing. The fiber laser comprises three parts of a pumping source, a resonator cavity and a gain medium. Longer the length of the cavity of the fiber laser, the nonlinear effect of the fiber laser is much substantial, thus it is necessary to shorten the length of the fiber. Meanwhile, the short cavity is an important condition to achieve single longitudinal mode operation for fiber laser. Short cavity fiber laser has a simple structure and is easy to be implemented. The short cavity fiber laser is typically consists of a pair of fiber gratings, and a gain medium connected therebetween, and this structure is called Distribute Bragg Reflection (DBR) type fiber laser. The short cavity fiber laser is usually used to generate narrow linewidth laser output. A U.S company NP Photonics utilized the 2 cm long erbium-doped phosphate glass fiber (DBR) laser to obtain the laser output with the power of 100 mW and the linewidth of 2 kHz. In 1992, Ball and others achieved a 1548 nm signal frequency output with the linewidth of 47 kHz which is consistent with Bragg wavelength using a 980 nm LD pump source by adding two Bragg gratings in the two ends of the 50 cm long Er3+ doped fiber for the first time, which the two bragg gratings are 1.25 cm long with the same bragg wavelength, and reflectance of 72% and 80% respectively. In 2007, A-FR company developed a type of fiber laser with the cavity length less than 5 cm, linewidth less than 3 kHz and output power up to 150 mW.

The short cavity fiber laser has several advantages such as a few numbers of longitudinal mode output, and stable output with no mode-hopping phenomena, and it is often used in field of fiber sensing. Therefore, there are important theoretical significance and application value to design a sensing system based on longitudinal mode output by the short cavity fiber laser.

The measurement of the temperature and the study of temperature sensor are important aspects in the field of sensing system. There are many methods for measuring the temperature, which can be divided into two categories, the contact temperature measuring method and the non-contact temperature measuring method according to whether the measurement body is in contact with the medium to be measured. The contact temperature measuring method is characterized in that the temperature sensing element is directly in contact and sufficiently exchanges heat with the object to be measured, and finally the thermal equilibrium is reached. The value of a certain physical parameter of the temperature sensing element represents the value of temperature of the object being measured at this time. The advantage of this temperature measurement method is intuitive and reliable, but the defect is the temperature sensing element will affect the distribution of the temperature field to be measured, and poor contact will bring measurement error. Furthermore, over high temperature and corrosive medium will bring adverse effects to the performance and life of the temperature sensing element. Non-contact temperature measuring method is characterized in that the thermal components do not contact with the object to be measured, but exchange the heat through the heat radiation, so it can avoid the disadvantage of the contact temperature measuring method and has a high limit for temperature measurement. In addition, the thermal inertia of the non-contact temperature measurement method is small, which is up to $\frac{1}{1000}$ second, so it is convenient for measuring the temperature of the moving object and the rapidly varying temperature. However, the measurement error of this method is large due to the influences of the object emissivity, the distance between the object to be measured to the instrument, and other media such as dust, vapor, etc. According to the above two methods of temperature measurement, the thermometer also be divided into contact and non-contact thermometer.

As the longitudinal mode output of short cavity fiber laser can be used as a sensing system, there is a need for a method and system for accurately measuring temperature of an object utilizing the features of the short cavity fiber laser.

SUMMARY OF INVENTION

The object of the present invention is to provide a method and system for accurately measuring magnetic field using longitudinal mode output by short cavity fiber laser.

According to one aspect of the present invention, it is provided a method for measuring temperature of an object using the longitudinal mode output by a short cavity fiber laser, the method comprising steps of a) arranging the short cavity fiber laser, which laser comprises sequentially coupled laser diode pumping source, a wavelength division multiplexer, a fiber bragg grating, an active optical fiber and a loop mirror which are; b) contacting the short cavity fiber laser with the object whose temperature will be measured; c) measuring the drift amount of longitudinal mode output by the short cavity fiber laser; and d) calculating the temperature of the object to be measured.

Preferably, said calculating in the step d) is to read the temperature corresponding to the drift of output longitudinal mode as measured in the step c), based on the calibrated relation curve between the drift of longitudinal mode output by the short cavity fiber laser and the temperature.

Preferably, the relation curve between the drift of longitudinal mode output by the short cavity fiber laser and the temperature is calibrated by contacting the short cavity fiber laser with the temperature controllable device at a known temperature.

Preferably, the relation curve is obtained by linear fitting or least square fitting.

Preferably, the active fiber of the short cavity fiber laser is selected from an erbium-doped fiber, an ytterbium-doped fiber or an Er/Yb co-doped fiber.

Preferably, the object whose temperature will be measured is gas or liquid.

Preferably, the object whose temperature to be measured is rod-shaped solid, and the short cavity fiber laser is twined on the rod-shaped solid and is fixed by a fixing unit.

Preferably, the fixing unit is epoxy resin or acrylate.

Preferably, the loop mirror comprises a coupler with the splitting ratio of 0.50.

Preferably, the temperature controllable device is electric heating plate.

According to the present invention, the temperature of an object can be measured accurately utilizing the features of the short cavity fiber laser. The arranged fiber laser has a small and simple structure, high measuring accuracy, good portability, and can be used in a variety of occasions.

It should be understood that the foregoing general description and the following detailed description are merely exemplary explanation, and shall not be construed as limiting the contents as claimed by the invention.

BRIEF DESCRIPTION OF DRAWINGS

Further objects, functions, and advantages of the present invention will be explained in details by embodiments of the present invention with reference to the accompanying drawings.

DETAILED DESCRIPTION OF THE INVENTION

Figure 1:
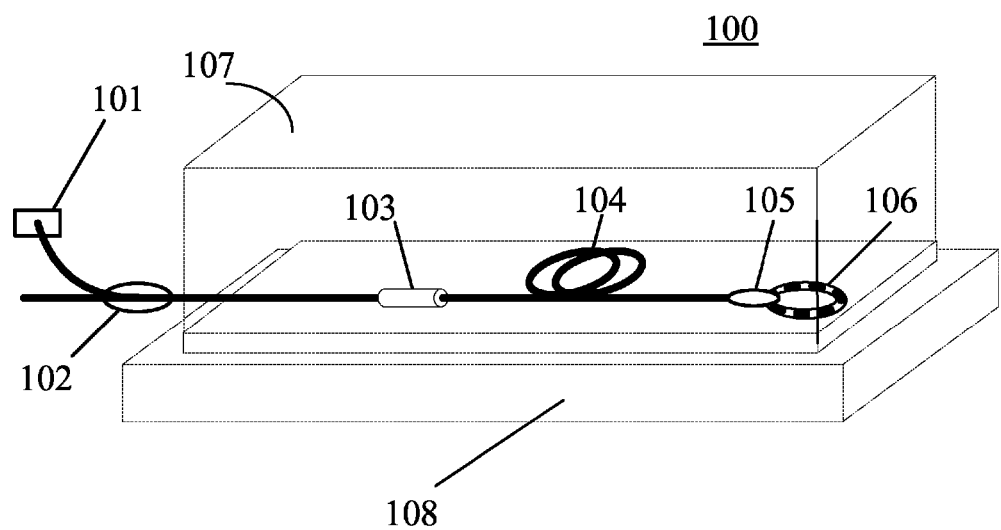
FIG. 1 schematically shows a short cavity fiber laser system for measuring temperature according to the first embodiment of the present invention.

Hereinafter, embodiments of the present invention will be explained in details with reference to drawings. In the accompanying drawings, like reference numerals designate the same or similar parts, or the same or similar procedures.

With reference to the exemplary embodiments, the purpose and function of the present invention and method to achieve these purpose and function will be explained. However, the present invention is not limited to the disclosed exemplary embodiments, and can be implemented with different forms. The description in nature is merely to help those skilled in the art to comprehensively understand the specific details of the invention.

The present invention will be described in detail with reference to the schematic figures. For the purpose of explanation, when describing the invention in details, the sectional figures representing the device structure will be partial enlarged not in general proportion, and the schematic figures are only exemplary and not intended to limit the scope claimed by the invention. Moreover, it should comprise three space dimensions of length, width and depth in the actual production.

The present invention provides a method for measuring temperature of an object using the longitudinal mode output by the short cavity fiber laser. The short cavity fiber laser according to the present invention uses a laser diode as the pumping source for the fiber laser, and an active optical fiber doped with rare-earth elements as the gain medium for the fiber laser, together with the fiber bragg grating (FBG), the fiber loop mirror (FLM), and the wavelength division multiplexer (WDM) to achieve the calibration and measurement for the temperature.

Resonance will occur in the laser when the cavity length of the laser resonator cavity is an integer multiple of the half wavelength of laser. Therefore theoretically, there is infinite number of wavelength producing resonance in resonator cavity. The interval between two adjacent resonant frequencies is referred as Free Spectral Range (FSR), and the optical path difference between two adjacent lasers is $\Delta=2\,nL$, wherein n is refractive index of the medium, L is physical length of the resonator cavity. Free Spectral Range (FSR) is the frequency interval between adjacent longitudinal mode output by the laser, and its physical meaning is the reciprocal of the time spend by a photon when making a round trip in the resonator cavity, and can be derived by the light speed in the vacuum c as:

$$FSR = \Delta v_q = \frac{c}{\Delta} = \frac{c}{2nL} \qquad (1)$$

$$\Delta v_q = v_{q+1} - v_q \qquad (2)$$

Therefore the cavity length of the resonator is shorter, the Free Spectral Range is larger, and wavelength may product resonance within the wavelength of gain provided by gain medium is lesser, which helps to reduce the number of modes of output laser. So a shorter cavity length L can reduce the number of the longitudinal mode output, and is convenient for measuring interval of the modes. Stretching or shrinking of the resonator cavity length L will occur when the temperature surrounding the resonator cavity changes, so drift of the longitudinal mode output by the laser will occur. By calibrating the standard conditions of temperature, the curve of the longitudinal mode drifting as the changes of temperature will be fitted, according to which the temperature within the scope of calibration can be measured.

Arranging the Short Cavity Fiber Laser System

FIG. 1 schematically shows the short cavity fiber laser system 100 for measuring liquid temperature according to the first embodiment of the present, which comprises a short cavity fiber laser comprising sequentially coupled laser diode pumping source 101, a wavelength division multiplexer 102, a fiber bragg grating 103, an active optical fiber 104 and a loop mirror 105. The laser diode pumping source 101, the wavelength division multiplexer 102, the fiber bragg grating 103, the active optical fiber 104 and the loop mirror 105 can be arranged by means of fusion welding. The short cavity fiber laser 100 is disposed in a water bath chamber 107, preferably fixed in the water bath chamber 107 by fixing units 106. Then the whole system is arranged on a temperature control device 108. The temperature control device 108 may be electric heating sheet or electric heating plate, etc. The active optical fiber 104 is used as a gain medium for the short cavity fiber laser. The fiber bragg grating 103 and the loop mirror 105 form as the two reflection ends of the resonator cavity. The wavelength division multiplexer 102 is used to couple the pumping light produced by the laser diode pumping source 101 into the active optical fiber 104. The fixing units 106 may be Epoxy Resin or Acrylate as adhesive, and for example, the loop mirror 105 may be fixed on the inner surface of the water bath chamber 107 by means of the adhesive.

The active optical fiber 104 is made of quartz glass, and the material characteristics of the quartz glass will change with the change of the environmental temperature. The influence of temperature on the length of the optical fiber can be determined by the influence of the environment temperature to be measured on the glass. Specifically, the resonator cavity length of short cavity fiber laser 100 is controlled under the condition of heating by the temperature control device 108, which causes the corresponding elongation or shortening of the resonator cavity length, thus leading to occurrence of the drift of longitudinal mode output by the laser. When the temperature rises, the cavity length is elongated, and the longitudinal mode output will drift towards the long wave; when the cavity length is shortened, the longitudinal mode output will drift towards the short wave. By gradually raising or lower the temperature, the corresponding increased or decreased value of the longitudinal mode drift will be recorded, and the curve for the longitudinal mode changes as the change of the temperature can be obtained.

The example as shown in FIG. 1 is a calibration arrangement before measuring the temperature of the liquid using the short cavity fiber laser system, and the calibration method is described in the following. In the calibration arrangement, the temperature of the temperature control unit 108 is known and adjustable. The liquid (such as water) in the water bath chamber 107 will be heated by controlling the temperature of the temperature control unit 108, so as to change the environment temperature of the short cavity fiber laser system disposed in the water bath chamber 107, which will cause the resonator cavity length to be elongated or shortened correspondingly, and lead to the longitudinal mode output by the laser to change. Then the corresponding relation curve can be drawn accordingly. After the calibration, the short cavity fiber laser system will be disposed into the liquid to be measured and contact with the liquid during the actual measurement. The temperature of the liquid to be measured can be obtained by measuring the change of the output longitudinal mode of the short cavity fiber laser system and comparing with the calibration curve.

The short cavity fiber laser system according to the present invention can be also used for measuring the temperature of gas in a similar way, that is, by replacing the water bath chamber 107 with a gas chamber. Using water bath to calibrate, and then determining the relationship between the temperature and the longitudinal mode drift within a certain range, the calibration curve of the whole system can be applied to the measurement of liquid, temperature environment etc.

The active optical fiber 104 may have a shorter length (for example, in cm order of magnitude), preferably doped with rare-earth elements and having a high doping concentration (for example, Er/Yb co-doped with the peak value absorption at 40±10 dB/m@1535 nm), so as to lower the pumping threshold of the system. The fiber bragg grating 103 has a higher reflectance (reflectance is more than 90% for some specific wavelength) to reduce the number of longitudinal modes output by laser. The center wavelength of the fiber bragg grating 103 determines the center wavelength of the laser output. The laser diode pumping source 101 is selected according to adsorption lines of the doped rare-earth element of the active optical fiber 104. The parameters of the wavelength division multiplexer 102, the fiber bragg grating 103 and the loop mirror 105 according to the embodiment of the invention need to match with the parameters of the pump wavelength, laser output wavelength, and active optical fiber. The specific parameters are shown in Table 1.

TABLE 1

Parameters of the short cavity fiber laser according to the present invention

| Doping element | Peak absorption | Cutoff wavelength | Cladding core diameter | Laser output wavelength | WDM wavelength | FLM wavelength |
| --- | --- | --- | --- | --- | --- | --- |
| Er | 30 dB/m @ 1530 nm<br>80 dB/m @ 1530 nm | 800-980 nm | Single mode | 1530 nm-1560 nm | 976/1550 nm | 1550 nm |
| Yb | 280 ± 50 dB/m @ 920 nm<br>0.6 ± 0.2 dB/m @ 920 nm<br>1.8 ± 0.4 dB/m @ 920 nm | 1010 ± 70 nm | 125 μm | 1060 nm-1090 nm | 915/1064 nm | 1064 nm |
| Erbium-Ytterbium co-doped | 0.75 ± 0.15 dB/m @ 915 nm<br>40 ± 10 dB/m @ 1535 nm | 1440 ± 80 nm | | 1530 nm-1560 nm | 976/1550 nm | 1550 nm |

According to the present invention, the inner diameter of the optical fiber is determined by the active optical fiber as adopted, the cladding core diameter is preferably 125 μm, and the inner diameter of the fiber may be 4 μm, 8 μm or 10 μm, preferably 10/125 μm. Corresponding core diameter of FLM, WDM and LD tail fiber will be chosen according to the selected core diameter. Pump wavelength matching the Erbium-doped fiber may be 980 nm or 1480 nm, pump wavelength matching the Ytterbium-doped fiber may be 976 nm or 915 nm, and pump wavelength matching the Er—Yb co-doped fiber may be 976 nm. The parameters of FLM and WDM may be determined according to the wavelength and core diameter. The ultimate wavelength output by the laser is within a certain gain range of the active optical fiber (such as 1530-1560 nm), and is determined by the reflected wavelength of fiber bragg grating. The typical emission wavelength of the Erbium-doped fiber is 1535 nm, and the typical emission wavelength of the Ytterbium-doped fiber is 1064 nm, and the typical emission wavelength of the Er—Yb co-doped fiber is 1550 nm.

For example, in the present embodiment, if 10/125 μm core diameter Erbium-doped fiber is selected as the gain medium, the LD tail fiber, WDM and FLM will be the same type of core diameter. The output wavelength of LD is 976 nm, the operating wavelength of WDM is 976/1550 nm, the operating wavelength of FLM is 1550 nm, and FBG is selected to be in the range of 1530 nm-1560 nm, within which range laser output can be obtained. If 10/125 μm core diameter Ytterbium-doped fiber is selected as the gain medium in the present embodiment, the LD tail fiber, WDM and FLM will be the same type of core diameter. LD is single mode output at 915 nm, the operating wavelength of WDM is 915/1064 nm, the operating wavelength of FLM is 1064 nm, and FBG is selected to be near 1064 nm, within which range laser output can be obtained.

Figure 2:
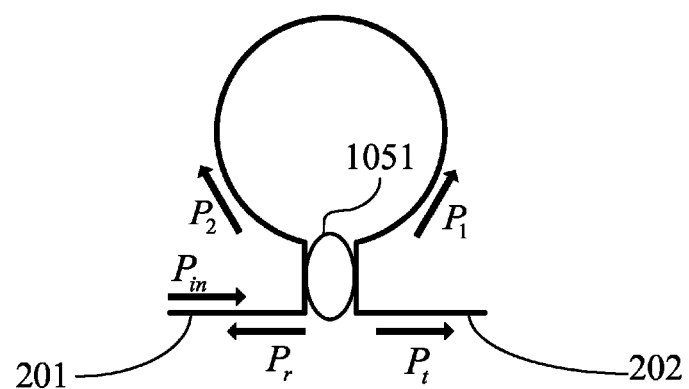
FIG. 2 is functional diagram of the loop mirror as shown in FIG. 1.

FIG. 2 shows the operating principle of loop mirror 105 in FIG. 1. As shown in FIG. 2, the loop mirror 105 according to the present invention is made by fusing two output terminals of coupler 1051. When the signal light $P_{in}$ is inputted from the signal input terminal 201, the signal light is divided into two beams at two output terminals of coupler 1051, which two beams are light $P_1$ transmitted counterclockwise in FIG. 2 and light $P_2$ transmitted clockwise in FIG. 2. $P_1$ and $P_2$ are coherent in coupler 1051 after transmitting, and the reflected light $P_r$ is emitted from the signal input terminal 201, and the transmitted light $P_t$ is emitted from the signal output terminal 202. Assuming the splitting ratio of the coupler 1051 is k, on the condition of ignoring the loss of the coupler 1051 itself and the fiber, when the input light power is $P_{in}$, the reflected light power $P_r$ and transmitted light power $P_t$ are as follows:

$$P_r = 4k(1-k)P_{in} \quad (3)$$

$$P_t = (1-2k)^2 P_{in} \quad (4)$$

Reflectivity R and transmittance T of the fiber loop mirror obtained from formula (3) and (4) are as follows:

$$R = 4k(1-k) \quad (5)$$

$$T = (1-2k)^2 \quad (6)$$

Therefore when the splitting ratio k=0.50, R=1 and T=0, the loop mirror 105 has the highest reflectivity, and play a role of loop reflection mirror. So according to a preferred embodiment of the present invention, the splitting ratio of the coupler 1051 in the loop mirror 105 is 50:50, that is, k=0.50.

Figure 3:
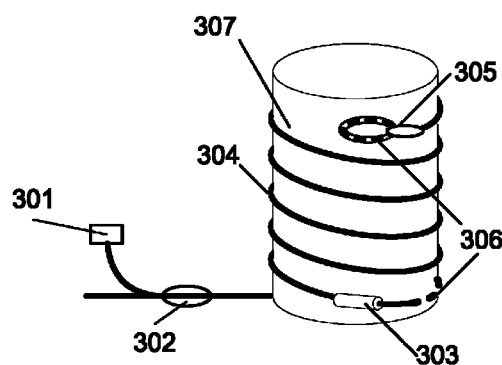
FIG. 3 schematically shows a short cavity fiber laser system for measuring temperature according to the second embodiment of the present invention.

FIG. 3 schematically shows the short cavity fiber laser system 300 for measuring magnetic field according to the second embodiment of the invention, which comprises sequentially coupled short cavity fiber laser comprising a laser diode pumping source 301, a wavelength division multiplexer 302, a fiber bragg grating 303, an active optical fiber 304 and a loop mirror 305. The laser diode pumping source 301, the wavelength division multiplexer 302, the fiber bragg grating 303, the active optical fiber 304 doped with rare-earth element doped and the loop mirror 305 can be arranged by means of fusion welding. The fiber bragg grating 303, the active optical fiber 304 and the loop mirror 305 of the short cavity fiber laser are twined and fixed on the rod-shaped temperature control unit 307 by a fixing unit 306. The active optical fiber 304 doped with rare-earth element is used as gain medium of the short cavity fiber laser. The fiber bragg grating 303 and the loop mirror 305 form as the two reflection ends of the resonator cavity. The wavelength division multiplexer 302 is used to couple the pumping light produced by the laser diode pumping source 301 into the active optical fiber 304. The fixing unit 306 can be Epoxy Resin or Acrylate as adhesive, and the two ends of the fiber bragg grating 303 and loop mirror 305 are fixed on the surface of the rod-shaped temperature control unit 307 by means of adhesive.

The example as shown in FIG. 3 is a calibration arrangement before the temperature of a solid object is measured using the short cavity fiber laser system. In this calibration arrangement, the temperature of the temperature control unit 307 is known and adjustable. The temperature of the short cavity fiber laser system contacting with the temperature control unit 307 will change by controlling the temperature of the temperature control unit 307, so as to cause the resonator cavity length to be elongated or shortened correspondingly, and lead to the longitudinal mode output by the laser to drift. Then the corresponding relation curve can be drawn accordingly. After the calibration, the short cavity fiber laser system will be fixed on the object to be measured in a similar way. The temperature of the object to be measured can be obtained by measuring the change of the output longitudinal mode of the short cavity fiber laser system and comparing with the calibration curve.

The parameters of the wavelength division multiplexer 302, the fiber bragg grating 303 and the loop mirror 305 according to the present embodiment may be selected to match with the parameters of the pump wavelength, laser output wavelength, and active optical fiber parameters. The specific parameters may be selected with reference to Table 1.

Calibration and Measurement of Temperature

Before measuring the temperature using the short cavity fiber laser system according to the present invention, the relationship between the change of longitudinal mode output by the short cavity fiber laser and the corresponding known temperature needs to be calibrated using known and variable temperature, and the corresponding curve for the relationship is also needed to be drawn. The short cavity fiber laser system according to the present invention is disposed in a hermetic gas chamber or water bath chamber, and is heated by a temperature control unit with known and adjustable temperature so as to adjust the temperature of the short cavity fiber laser system. Alternatively, the short cavity fiber laser system may be fixed on a temperature control unit with known and adjustable temperature directly. By adjusting the temperature change of the temperature control unit, the length of the resonator cavity of the fiber laser will change as the applied temperature changes, which results in the change of the longitudinal mode output by the short cavity fiber laser contacting or fixed on the temperature control unit. Therefore, the temperature may be calibrated or measured using the changes of longitudinal mode output based on the corresponding relationship of their changes.

According to the short cavity fiber laser system arranged as shown in FIG. 1 and FIG. 2, the temperature of the temperature control unit will be gradually increased or decreased, which leads to the longitudinal mode output by the laser to drift. The data will be recorded and a curve will be fitted so as to make a calibration.

The wavelength of the fiber grating is $\lambda_B = 2n_{eff}\Lambda$, wherein $n_{eff}$ is the effective refractive index of the guided mold, $\Lambda$ is the grating period. There are many factors to cause the fiber grating $\lambda_B$ to drift. If only the influence of the temperature T is considered, $\lambda_B$, $n_{eff}$, $\Lambda$ are just a function of T. Assuming that initially the temperature of the temperature field of the grating is $T_0$, $\lambda_B(T)$ is made with Taylor Expansion and the second order terms is as follows, $$\lambda_B(T) = \lambda_B(T_0) + \frac{d\lambda_B(T)}{dT} \cdot \Delta T + \frac{1}{2}\frac{d\lambda_B^2(T)}{dT^2} \cdot \Delta T^2 \quad (7)$$

Wherein $\Delta T = T - T_0$, and from $\lambda_B = 2n_{eff}\Lambda$ and formula (7) it is, $$\frac{\Delta \lambda_B}{\lambda_B} = \frac{\lambda_B(T) - \lambda_B(T_0)}{\lambda_B(T)} = \frac{1}{\lambda_B} \cdot \frac{d\lambda_B}{dT} \cdot \Delta T + \frac{1}{2} \cdot \frac{1}{\lambda_B} \cdot \frac{d\lambda_B^2}{dT^2} \cdot \Delta T^2 \quad (8)$$

Formula (8) can be simplified as:

$$\frac{\Delta \lambda_B}{\lambda_B} = \eta_{T1} \cdot \Delta T + \eta_{T2} \cdot \Delta T^2 = (\eta_{T1} + \eta_{T2} \cdot \Delta T) \cdot \Delta T = \eta_T \cdot \Delta T \quad (9)$$

Wherein in the Formula (9), $$\begin{cases} \eta_{T1} = \frac{1}{\lambda_B} \cdot \frac{d\lambda_B}{dT} \\ \eta_{T2} = \frac{1}{2} \cdot \frac{1}{\lambda_B} \cdot \frac{d\lambda_B^2}{dT^2} \\ \eta_T = \eta_{T1} + \eta_{T2} \cdot \Delta T \end{cases}$$

Wherein $\eta_{T1}$ and $\eta_{T2}$ respectively represents the first-order and second-order temperature sensitivity coefficient of the fiber grating, and $\eta_T$ represents the effective linear temperature sensitivity coefficient. Find the natural logarithm of $\lambda_B = 2n_{eff}\Lambda$, and the derivative of T is, $$\frac{1}{\lambda_B} \cdot \frac{d\lambda_B}{dT} = \frac{1}{n_{eff}} \cdot \frac{dn_{eff}}{dT} + \frac{1}{\Lambda} \cdot \frac{d\Lambda}{dT} \tag{10}$$

Wherein $$\frac{1}{n_{eff}} \cdot \frac{dn_{eff}}{dT}$$

represents the thermo-optic coefficient of the fiber grating which is denoted with $\xi$, and $$\frac{1}{\Lambda} \cdot \frac{d\Lambda}{dT}$$

represents the thermal expansion coefficient of the fiber grating which is denoted with $\alpha$. So the formula (10) is $$\frac{1}{\lambda_B} \cdot \frac{d\lambda_B}{dT} = \xi + \alpha \tag{11}$$

Thus, $$\frac{1}{\lambda_B} \cdot \frac{d^2\lambda_B}{dT^2} = \left[\frac{d\xi}{dT} + \frac{d\alpha}{dT} + (\xi+\alpha)^2\right] \tag{12}$$

So, $$\begin{cases} \eta_{T1} = \xi + \alpha \\ \eta_{T2} = \frac{1}{2}\left[\frac{d\xi}{dT} + \frac{d\alpha}{dT} + (\xi+\alpha)^2\right] \\ \eta_T = (\xi+\alpha) + \frac{1}{2}\left[\frac{d\xi}{dT} + \frac{d\alpha}{dT} + (\xi+\alpha)^2\right] \cdot \Delta T \end{cases} \tag{13}$$

At the room temperature, the thermal expansion coefficient and thermal-optical coefficient of the melting silica is a $\alpha \approx 0.5 \times 10^{-6}/°C$ and $\xi \approx 8.3 \times 10^{-6}/°C$, so $$\begin{cases} \eta_{T1} = 8.8 \times 10^{-6}/°C \\ \eta_{T2} = \frac{1}{2} \cdot \frac{d\xi}{dT} + 3.9 \times 10^{-11}/°C \\ \eta_T = 8.8 \times 10^{-6} + \left[\frac{1}{2} \cdot \frac{d\xi}{dT} + 3.9 \times 10^{-11}\right] \cdot \Delta T/°C \end{cases} \tag{14}$$

Therefore, a linear relationship between the temperature change $\Delta T$ and the output wavelength change $\Delta\lambda_B$ can be derived by formula (9). The temperature change $\Delta T$ and the longitudinal mode change $\Delta\lambda_B$ will be fitted as a curve as follows.

The curve fitting may be linear fitting, as shown in formula (15).

$$y = ax + b \tag{15}$$

Alternatively, the curve fitting may be the least square fitting, and the curve as fitted can be obtained by formulas (16) and (17).

$$\frac{\partial S}{\partial a_0} \sum_{i=0}^{n} (y_i - a_0 - a_1 x_i) = 0 \tag{16}$$

$$\frac{\partial S}{\partial a_1} \sum_{i=0}^{n} (y_i - a_0 - a_1 x_i) = 0 \tag{17}$$

By solving the above equations, $a_0$ and $a_1$ is obtained, and an approximating function satisfying the square approximation condition is obtained as, $$f(x) = a_0 + a_1 x \tag{18}$$

Figure 4:
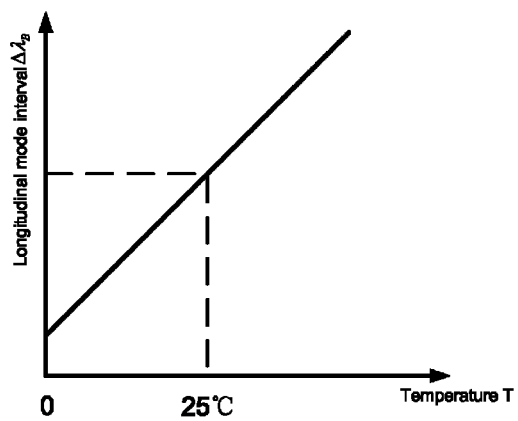
FIG. 4 is a fitted relation curve between temperature and drift of short longitudinal mode output by laser.

Finally, the temperature can be measured by the relationship curve between the temperature and the drift amount of the longitudinal mode output by the laser. The temperature surrounding the resonator cavity can be determined using the calibrated temperature curve. FIG. 4 shows the fitted relationship curve between the temperature and the drift amount of longitudinal mode output by the laser. As shown in FIG. 4, the temperature T shown in the vertical axis is converted by $\Delta T$ obtained from the fitting curve after the initial temperature of the object to be measured is determined.

When measuring the temperature by using the calibrated relation curve between the temperature and the drift amount of laser longitudinal mode, the short cavity fiber laser according to the invention will be disposed in the temperature field to be measured. By collecting the changing trend of the wavelength $\lambda_B$ of the laser output by a spectrometer, the interval of $\lambda_B$ which is the varied amount of the longitudinal mode $\Delta\lambda_B$ is obtained. Referring to the calibrated relation curve between the known temperature and the drift amount of longitudinal mode of the laser, the temperature of the object to be measured can be obtained.

Figure 5:
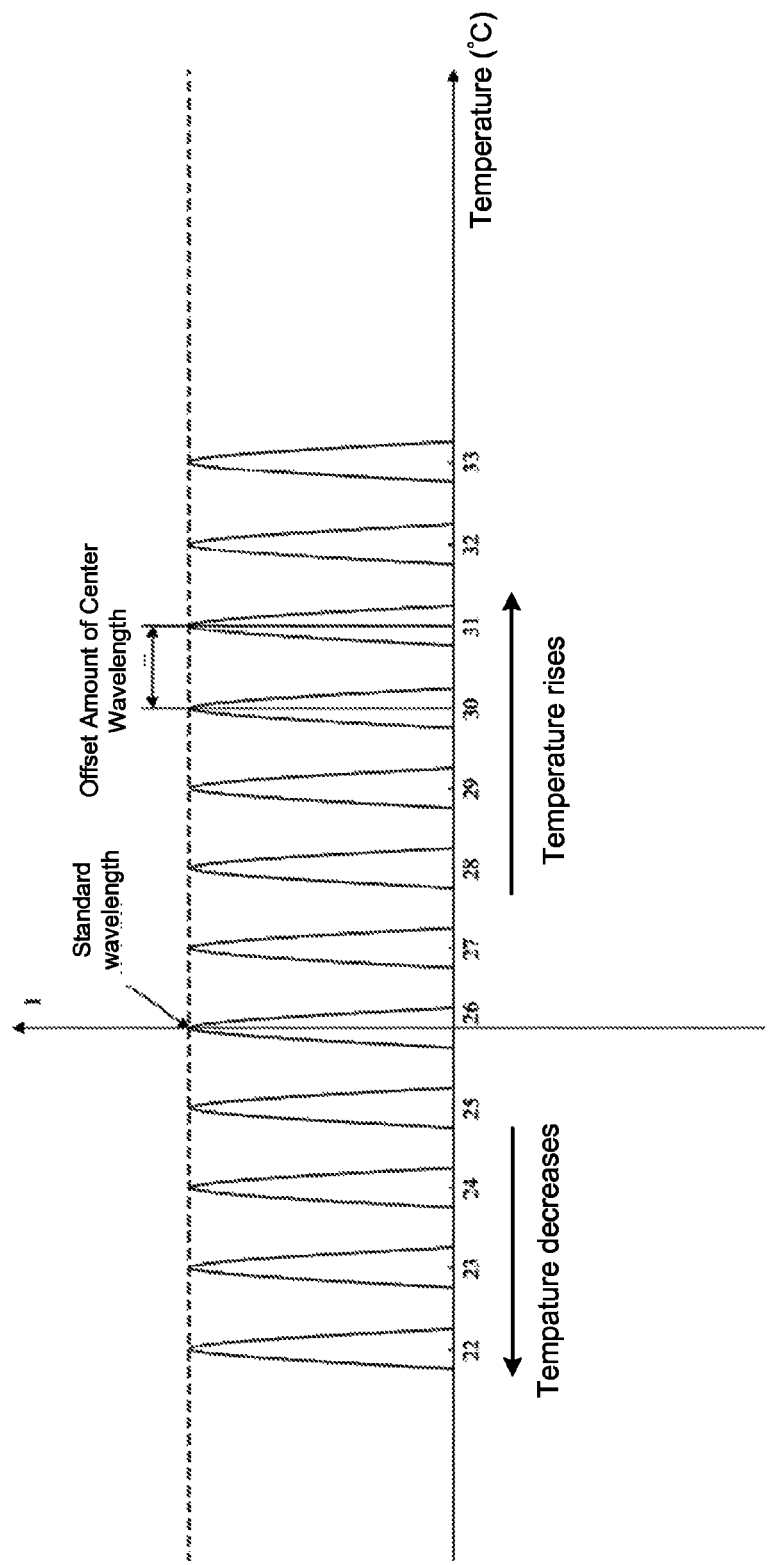
FIG. 5 is a waveform graph showing the drift of longitudinal mode output by laser changed with the change of temperature.

FIG. 5 schematically shows a waveform graph in which the drift of longitudinal mode output by the laser changes with the change of the temperature. As shown in FIG. 5, the laser according to the present invention is a single longitudinal mode output. A wavelength at specific temperature (26 in the present embodiment) is calibrated as a standard wavelength. When the temperature increases, the center wavelength of the standard wavelength offsets to the right side of the figure, and when the temperature decreases, the center wavelength of the standard wavelength offsets to the left side of the figure. By collecting the changing trend of the wavelength $\lambda_B$ output by the laser by a spectrometer, the offset amount of the center wavelength can be obtained, and then the temperature to be measured can be obtained referring to the curve.

According to the present invention, the temperature can be measured accurately utilizing the features of the short cavity fiber laser. The arranged fiber laser has a small and simple structure, high measuring accuracy, good portability, and can be used in a variety of occasions.

Combined with the disclosed description and practice of the present invention, it is easy for those skilled in the art to contemplate and understand other embodiments of the invention. The description and embodiments are merely exemplary, and the scope and spirit of the invention will be limited by the claims.

What is claimed is:

1. A method for measuring temperature of an object, comprising:
    a) arranging a short cavity fiber laser, wherein the short cavity fiber laser comprises sequentially coupled a laser diode pumping source, a wavelength division multiplexer, a fiber Bragg grating, an active optical fiber and a loop mirror, and wherein the short cavity fiber laser has only one laser source, only one active optical fiber and only one fiber Bragg grating;
    b) contacting the short cavity fiber laser with the object;
    c) measuring a drift of a longitudinal mode output of the short cavity fiber laser, wherein the drift is generated by the temperature of the object; and
    d) calculating the temperature of the object according to the drift.

2. The method according to claim 1, wherein said calculating in the step d) is to read the temperature based on a calibrated relation curve and the drift, and wherein the calibrated relation curve was previously obtained using test temperatures of a standard object and test drifts of the longitudinal mode output of the short cavity fiber laser generated by the test temperatures.

3. The method according to claim 2, wherein the relation curve is obtained by linear fitting or least square fitting data of the test temperatures and the test drifts.

4. The method according to claim 2, wherein the relation curve between the test drifts and the test temperatures is calibrated by contacting the short cavity fiber laser with a temperature controllable device at a known temperature.

5. The method according to claim 4, wherein the relation curve is obtained by linear fitting or least square fitting of the test temperatures and the test drifts.

6. The method according to claim 4, wherein the temperature controllable device is electric heating plate.

7. The method according to claim 1, wherein the active fiber of the short cavity fiber laser is selected from an erbium-doped fiber, an ytterbium-doped fiber or an Er/Yb co-doped fiber.

8. The method according to claim 1, wherein the object whose temperature will be measured is gas or liquid.

9. The method according to claim 1, wherein the object whose temperature to be measured is rod-shaped solid, and the short cavity fiber laser is twined on the rod-shaped solid and is fixed by a fixing unit.

10. The method according to claim 9, wherein the fixing unit is epoxy resin or acrylate.

11. The method according to claim 1, wherein the loop mirror comprises a coupler with the splitting ratio of 0.50.

* * * * *